(12) United States Patent
Want et al.

(10) Patent No.: US 8,041,951 B2
(45) Date of Patent: Oct. 18, 2011

(54) CODE-BASED COMMUNICATION CONNECTION MANAGEMENT

(75) Inventors: Roy Want, Los Altos, CA (US); Trevor A. Pering, Palo Alto, CA (US); Richard Sharp, Cambridge (GB); John J. Light, Beaverton, OR (US); Edward C. Epp, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1024 days.

(21) Appl. No.: 11/540,791

(22) Filed: Sep. 29, 2006

(65) Prior Publication Data

US 2008/0104394 A1 May 1, 2008

(51) Int. Cl.
H04L 9/32 (2006.01)
H04L 9/30 (2006.01)
H04L 9/34 (2006.01)

(52) U.S. Cl. ........ 713/169; 713/168; 713/170; 713/171; 380/227; 380/229; 709/227; 709/228; 709/229; 709/230; 455/41.2; 455/41.3; 455/557

(58) Field of Classification Search .................. None
See application file for complete search history.

(56) References Cited

U.S. PATENT DOCUMENTS

| | | | |
|---|---|---|---|
| 6,892,052 B2 * | 5/2005 | Kotola et al. ................ 455/41.2 |
| 7,392,387 B2 | 6/2008 | Balfanz et al. |
| 7,454,619 B2 | 11/2008 | Smetters et al. |
| 7,546,083 B2 | 6/2009 | Fadell |
| 7,581,096 B2 | 8/2009 | Balfanz et al. |
| 7,643,789 B2 | 1/2010 | Fadell |
| 7,720,888 B2 | 5/2010 | Kim et al. |
| 7,734,313 B2 | 6/2010 | Grams et al. |
| 2003/0114190 A1 | 6/2003 | Want et al. |
| 2004/0041849 A1 * | 3/2004 | Mock et al. .................. 345/867 |
| 2004/0093527 A1 | 5/2004 | Pering et al. |
| 2004/0176032 A1 * | 9/2004 | Kotola et al. ................ 455/41.2 |
| 2004/0192383 A1 * | 9/2004 | Zacks et al. .................. 455/557 |
| 2005/0102376 A1 | 5/2005 | Ichikawa |
| 2005/0128293 A1 * | 6/2005 | Wilsey et al. ................ 348/143 |
| 2005/0128958 A1 * | 6/2005 | Hamdan ...................... 370/254 |
| 2005/0165795 A1 | 7/2005 | Myka et al. |
| 2005/0178829 A1 * | 8/2005 | Rosenberg .................... 235/380 |
| 2005/0192052 A1 | 9/2005 | Tenhunen |
| 2005/0198035 A1 | 9/2005 | Sundararajan et al. |
| 2005/0215195 A1 | 9/2005 | Light et al. |
| 2006/0000910 A1 * | 1/2006 | Chong et al. ............ 235/462.15 |
| 2006/0062582 A1 * | 3/2006 | Suzuki et al. ................ 398/183 |
| 2006/0087999 A1 * | 4/2006 | Gustave et al. ............. 370/328 |
| 2006/0172778 A1 | 8/2006 | Sundararajan et al. |
| 2006/0242687 A1 * | 10/2006 | Thione et al. .................... 726/4 |
| 2007/0226484 A1 | 9/2007 | Pering et al. |
| 2007/0287386 A1 * | 12/2007 | Agrawal et al. ............ 455/67.11 |
| 2008/0227391 A1 * | 9/2008 | Rosenberg .................... 455/41.1 |
| 2009/0091425 A1 * | 4/2009 | Sharpe ......................... 340/7.21 |
| 2009/0117848 A1 * | 5/2009 | Nagata et al. ................ 455/41.2 |
| 2009/0184842 A1 * | 7/2009 | Baldus et al. ............ 340/870.07 |

* cited by examiner

Primary Examiner — Syed A. Zia
(74) Attorney, Agent, or Firm — Caven & Aghevli LLC

(57) ABSTRACT

In some embodiments, an electronic apparatus comprises a communication interface, an input/output interface, a processor, and logic to collect, in the electronic apparatus, a first identifier associated with a first communication device and second identifier associated with a second communication device, logic to establish a communication connection between the electronic apparatus and the first communication device, and logic to initiate, in the electronic apparatus, a connection request for a communication connection between the first communication device and the second communication device. Other embodiments may be described.

16 Claims, 6 Drawing Sheets

CODE-BASED COMMUNICATION CONNECTION MANAGEMENT

BACKGROUND

The subject matter described herein relates generally to the field of electronic communication and more particularly to code-based communication connection management.

Electronic devices may establish communication connections with other electronic devices to facilitate information exchange between the devices. Presently, electronic devices such as, e.g., digital watches, heart rate monitors, and the like are being designed with wireless communication interfaces to enable wireless communication with other electronic devices. The wireless communication interface may operate pursuant to one or more communication protocols such as, e.g., Bluetooth or one of the protocols in the 802.11 family of communication protocols.

Many electronic devices have extremely limited user interfaces. For example, many digital watches are controlled by an application specific integrated circuit (ASIC) that uses three to six buttons as the user interface. The limited user interface creates difficulties in performing complex operations such as, e.g., establishing communication connections, using the device.

Communication connections between electronic devices may be secure. For example, encryption techniques may be implemented to secure resource(s) provided by an electronic device such as, e.g., a web server. A user seeking to access the resource(s) may need to authenticate itself to the server.

BRIEF DESCRIPTION OF THE DRAWINGS

The detailed description is described with reference to the accompanying figures.

DETAILED DESCRIPTION

Described herein are exemplary systems and methods for code-based communication connection management. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Facilitating Communication between Wireless Devices

Figure 1A:
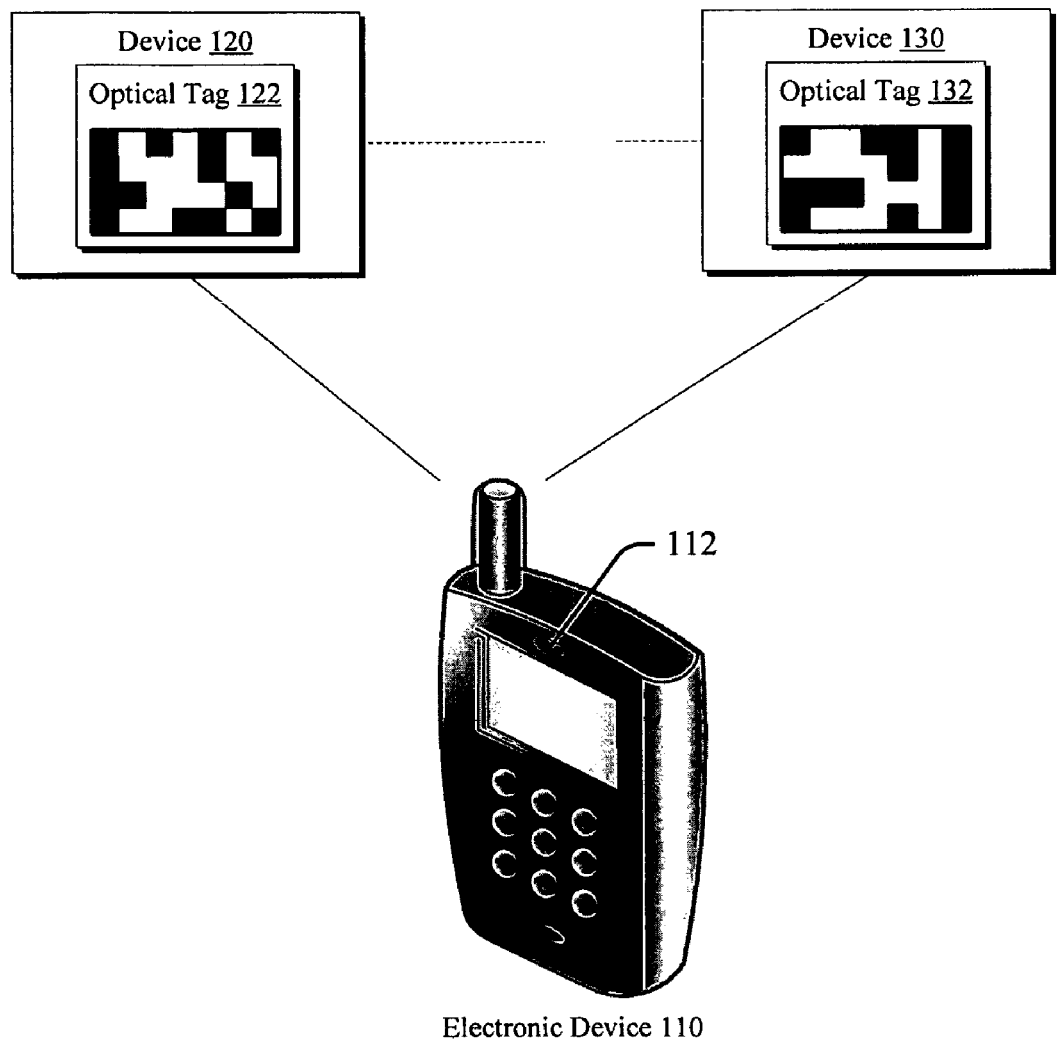
FIG. 1A is a schematic; illustration of an arrangement for performing code-based communication connection management according to some embodiments.

FIG. 1A is a schematic illustration of an arrangement for performing code-based communication connection management according to some embodiments. Referring to FIG. 1, in some embodiments an electronic device 110 may be used to facilitate code-based communication management between a first communication device 120 and a second communication device 130.

In one embodiment, electronic device 110 may be embodied as a mobile telephone, which may be equipped with a camera 112. In an alternate embodiment, electronic device 110 may be embodied as a digital camera that includes a wireless communication interface. First communication device 120 and second communication device 130 may be embodied as electronic devices which include one or more wireless communication interfaces such as, e.g., a Bluetooth interface or an 802.11 interface. In some embodiments the first communication device 120 and the second communication device 130 may be embodied as devices which have minimal user interfaces such as, e.g., a digital watch, a heart rate monitor, or the like.

In some embodiments, first communication device 120 may include an optical tag 122 associated with the device 120. Optical tags 122, 132 may be embodied as, e.g., a unique display pattern such as a block code, a bar code, or any other tag that uniquely identifies a device. In one embodiment, optical tags 122, 132 may be embodied as a digital block symbol. For example, when the first communication devices 120, 130 are embodied as a digital watch or other digital device the digital device 120 may generate a random numerical code such as, e.g., a binary code, which may be presented on a screen as a block symbol. For example, a digital "0" may be presented as a light block on the screen and a digital "1" may be presented as a dark block on the screen, or vise-versa.

In other embodiments, optical tags 122 may be physically associated with first communication devices 120. Alternatively, optical tag 122 may be encoded in a memory module embedded in first communication device 120 and may be presented on a display of first communication device. Similarly, second communication device 130 may include an optical tag 132, which may be physically associated with second communication device 130 or stored in a memory module of second communication device 130 for presentation on a display of second communication device.

Figure 1B:
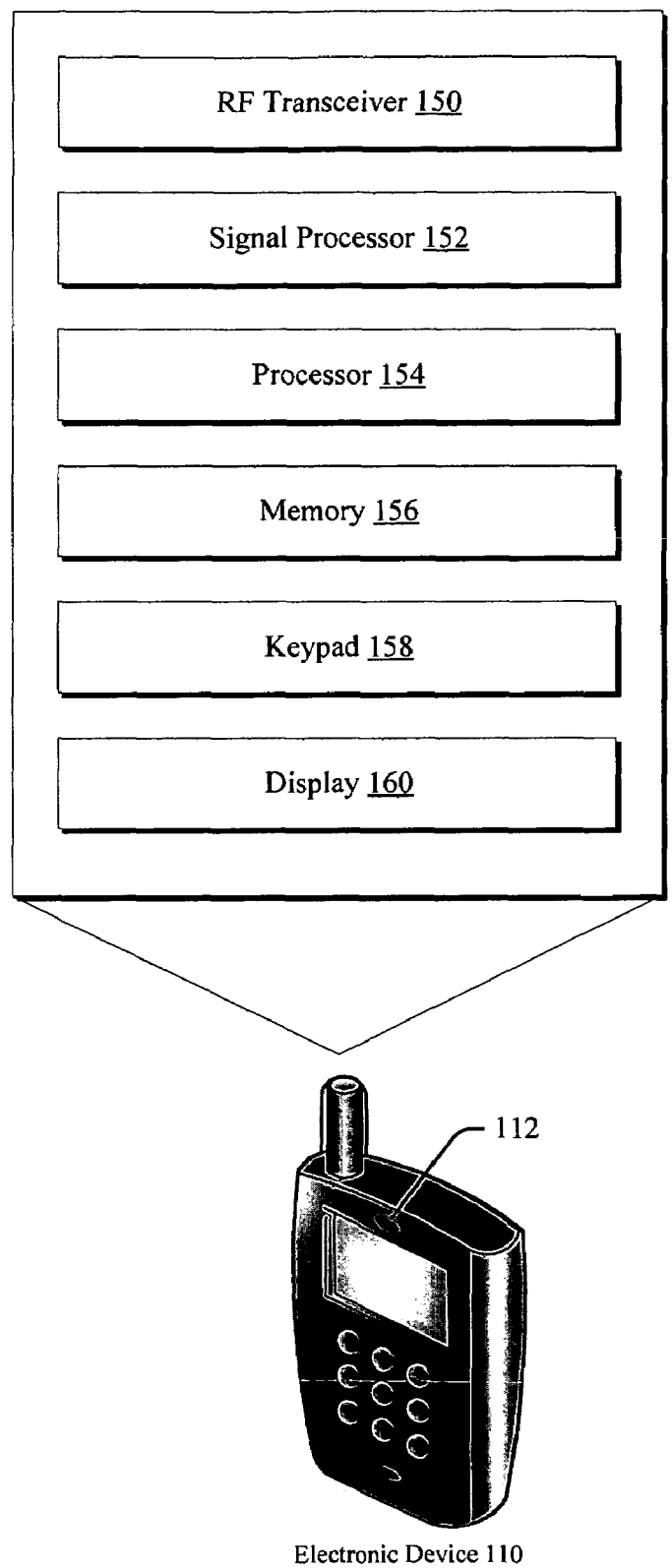
FIG. 1B is a schematic illustration of an electronic device for use in performing code-based communication connection management according to some embodiments.

FIG. 1B is a schematic illustration of an electronic device for use in performing code-based communication connection management according to some embodiments. Referring to FIG. 1B, in some embodiments electronic device 110 may be embodied as a mobile telephone, a personal digital assistant (PDA) or the like. Electronic device 110 may include an RF transceiver 150 to transceive RF signals and a signal processing module 152 to process signals received by RF transceiver 150.

RF transceiver may implement a local wireless connection via a protocol such as, e.g., Bluetooth or 802.11X. IEEE 802.11a, b or g-compliant interface (see, e.g., IEEE Standard, for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 110 may further include a processor 154 and a memory module 156. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 154 may be one or more processors in the family of Intel® PXA27x processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design. In some embodiments, memory module 156 includes random access memory (RAM); however, memory module 156 may be implemented using other memory types such as dynamic RAM (DRAM), synchronous DRAM (SDRAM), and the like.

Electronic device 110 may further include one or more input/output interfaces such as, e.g., a keypad 158 and a display 160.

Figure 2:
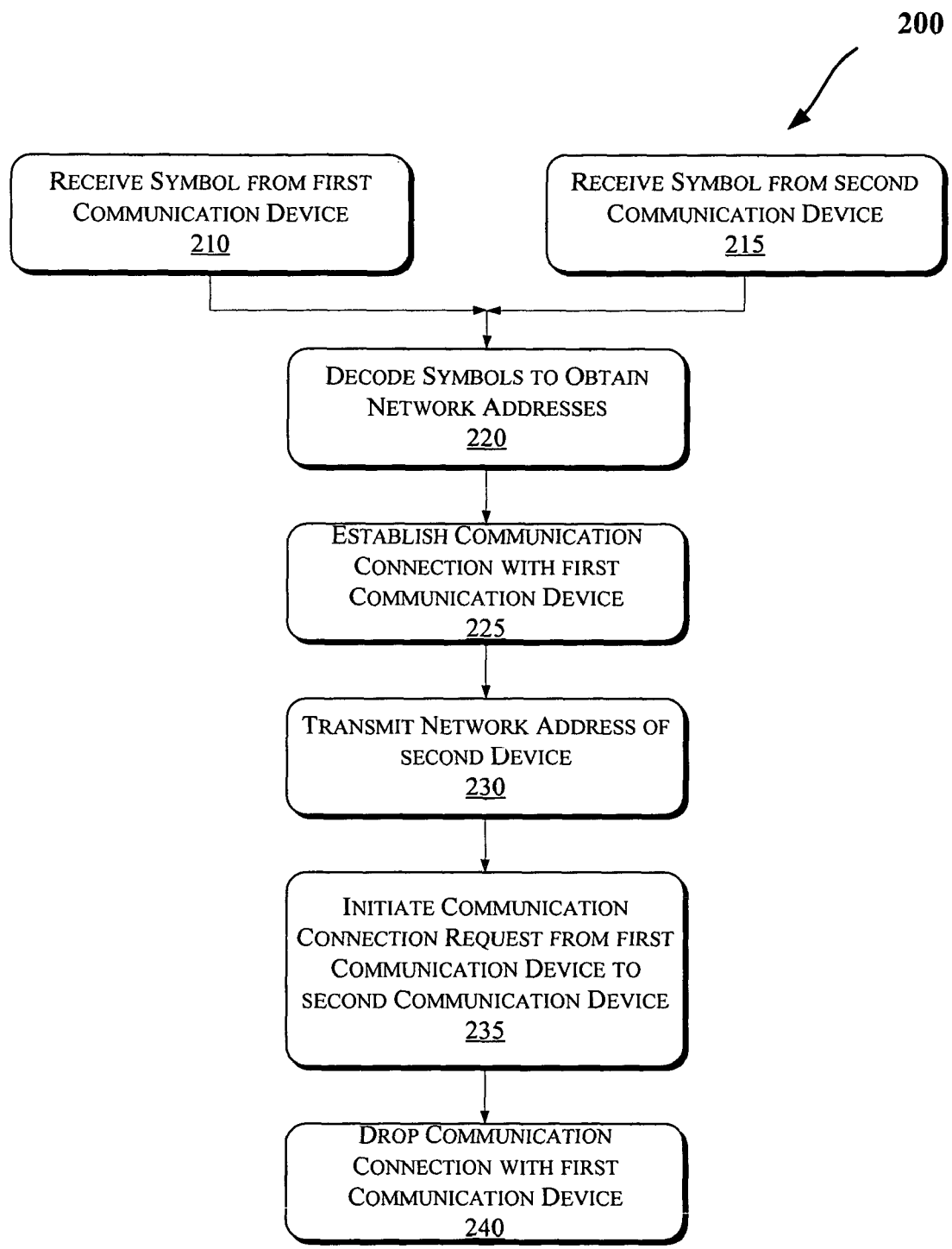
FIG. 2 is a flowchart illustrating code-based communication connection management operations performed according to some embodiments.

Referring back to FIG. 1A, electronic device 110 may be configured to facilitate code-based communication connection management. More particularly, electronic device 110 may be configured to facilitate establishing a communication connection between first communication device 120 and second communication device 130. FIG. 2 is a flowchart illustrating code-based communication connection management operations performed by electronic device 110 according to some embodiments.

Referring to FIG. 2, at operation 210 electronic device 110 receives an symbol from first communication device 120 and at operation 215 electronic device 110 receives a symbol from second communication device 130. Operations 210 and 215 may be performed contemporaneously or in a sequence. In some embodiments, electronic device 110 may receive a symbol from first communication device 120 by using a camera 112 on electronic device 110 to take a photograph of optical tag 122. Similarly, electronic device 110 may receive a symbol from second communication device 130 by using a camera 112 on electronic device 110 to take a photograph of optical tag 132. In alternate embodiments the first communication device 120 and the second communication device 130 may include a character sequence rather than, or in addition to, optical tags 122, 132. In such embodiments, electronic device 110 may receive a symbol by entering the character sequences into the keypad on electronic device 110. In alternate embodiments the first communication device 120 and the second communication device 130 may include radio frequency identification (RFID) tags in addition to or in lieu of optical tags. In such embodiments, electronic device 110 may receive a symbol by detecting the RFID tags.

At operation 220 the symbols collected in operations 210 and 215 are decoded to obtain network addresses for first communication device 120 and second communication device 130. In some embodiments the network addresses may correspond to the respective wireless media access control (MAC) addresses of first communication device 120 and second communication device 130.

In some embodiments, electronic device 110 establishes a communication connection with first communication device 120 at operation 225, and at operation 230 electronic device 100 transmits the network address of second communication device 130 to first communication device 120.

At operation 235 electronic device 110 initiates a communication from the first communication device 120 to the second communication device 130. The communication may include the network address for the second communication device 130. In some embodiments electronic device 100 may include an encryption key with the communication connection request.

In response to the communication from electronic device 110, first communication device 120 may use the network address of second communication device 130 to initiate a communication with second communication device 130. In some embodiments, the communication may include a message broadcast from first communication device 120 that includes the network address of second communication device 130.

In response to the communication, a communication connection may be established between first communication device 120 and second communication device 130. Once the communication connection is established, first communication device 120 may notify electronic device 110 that the communication connection is in place. At operation 240 electronic device 110 may drop the communication connection with first communication device 120. Thus, the operations of FIG. 2 enable an electronic device 110 to facilitate a communication connection between a first communication device 120 and a second communication device 120.

In alternate embodiments, at operation 225 electronic device 110 may establish a communication connection with second communication device 130 in lieu of, or in addition to, first electronic device 120. Electronic device 110 may pass the MAC address of first communication device 120 and an encryption key to second communication device 130 via the communication connection. Electronic device 110 may initiate a communication connection request with second communication device 130 at operation 235, and may drop this communication request at operation 240.

Secure Device Access

Figure 3:
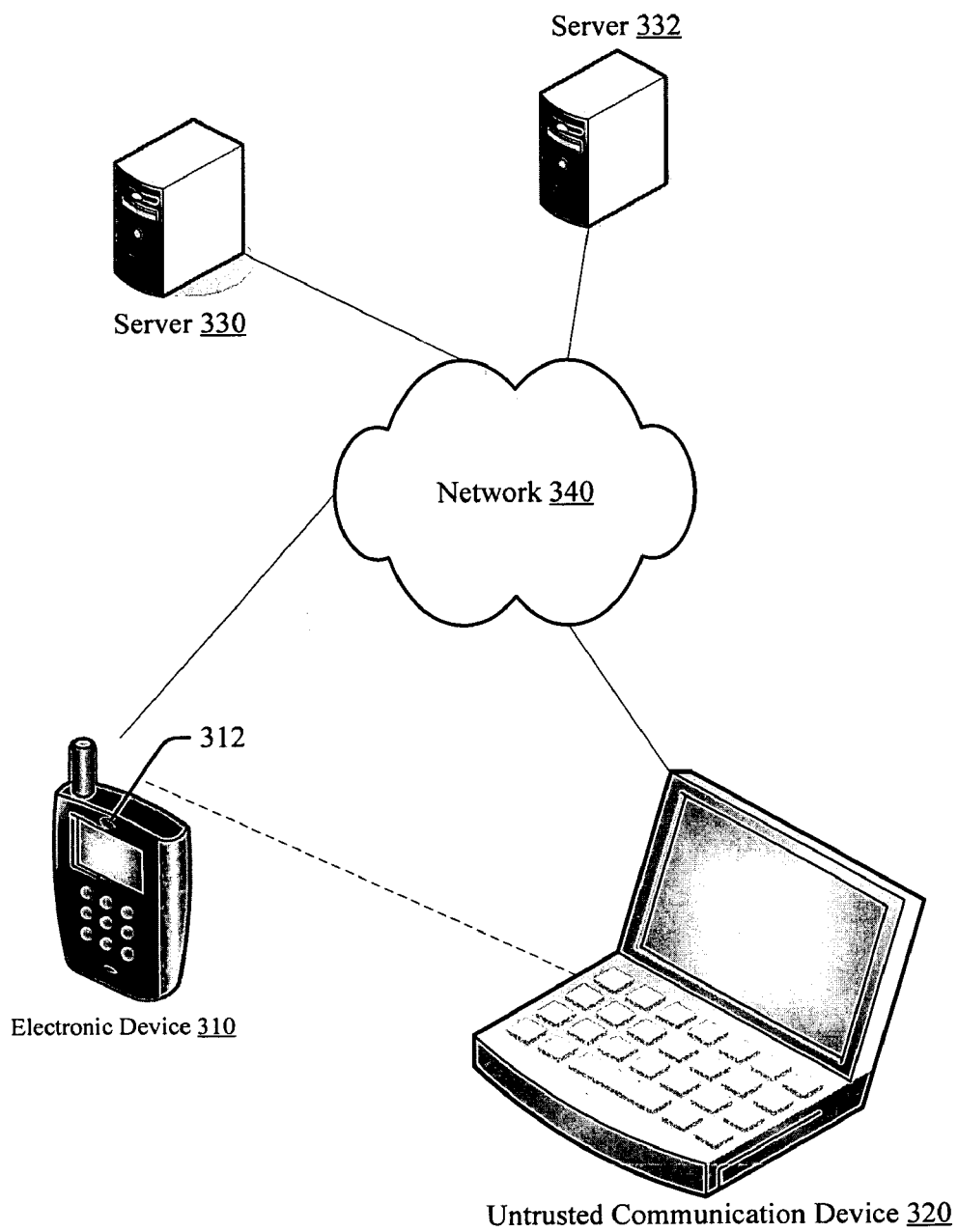
FIG. 3 is a schematic illustration of an arrangement for performing code-based communication connection management according to some embodiments.

FIG. 3 is a schematic illustration of an arrangement for performing code-based communication connection management according to some embodiments. Referring to FIG. 3, an electronic device 310 may be coupled to one or more resources provided by servers 330, 332 via a network 340. In some embodiments electronic device 310 may be embodied as a mobile telephone, PDA or other mobile computing device as described with reference to electronic device 110, above. Network 340 may be embodied as a public communication network such as, e.g., the internet, or as a private communication network. Servers 330, 332 may be embodied as computer systems. Untrusted computing device 320 may be embodied as a mobile computer, desktop computer, or other similar computing device.

In some embodiments, an electronic device 310 may include one or more private resources such as, e.g., web content which may be stored on electronic device 310 or access information for web content stored on servers 330, 332. In some instances, an owner or user of electronic device 310 may wish to access the private resources from an untrusted communication device 320. For example, the web content may not be compatible with the display on electronic device or may require processing power that exceeds the capability of electronic device. Alternatively, the owner or user of electronic device 310 may wish to conserve the power of electronic device. Thus, the owner or user of electronic device 310 may seek to establish a relationship of trust between electronic device 310 and untrusted communication device 320. As such, it is useful to establish a mechanism to confirm that a person communicating with the electronic device 310 is the person in possession of the device 310, not someone else who can communicate with the electronic device 310 via, e.g., a wireless communication connection.

Figure 4:
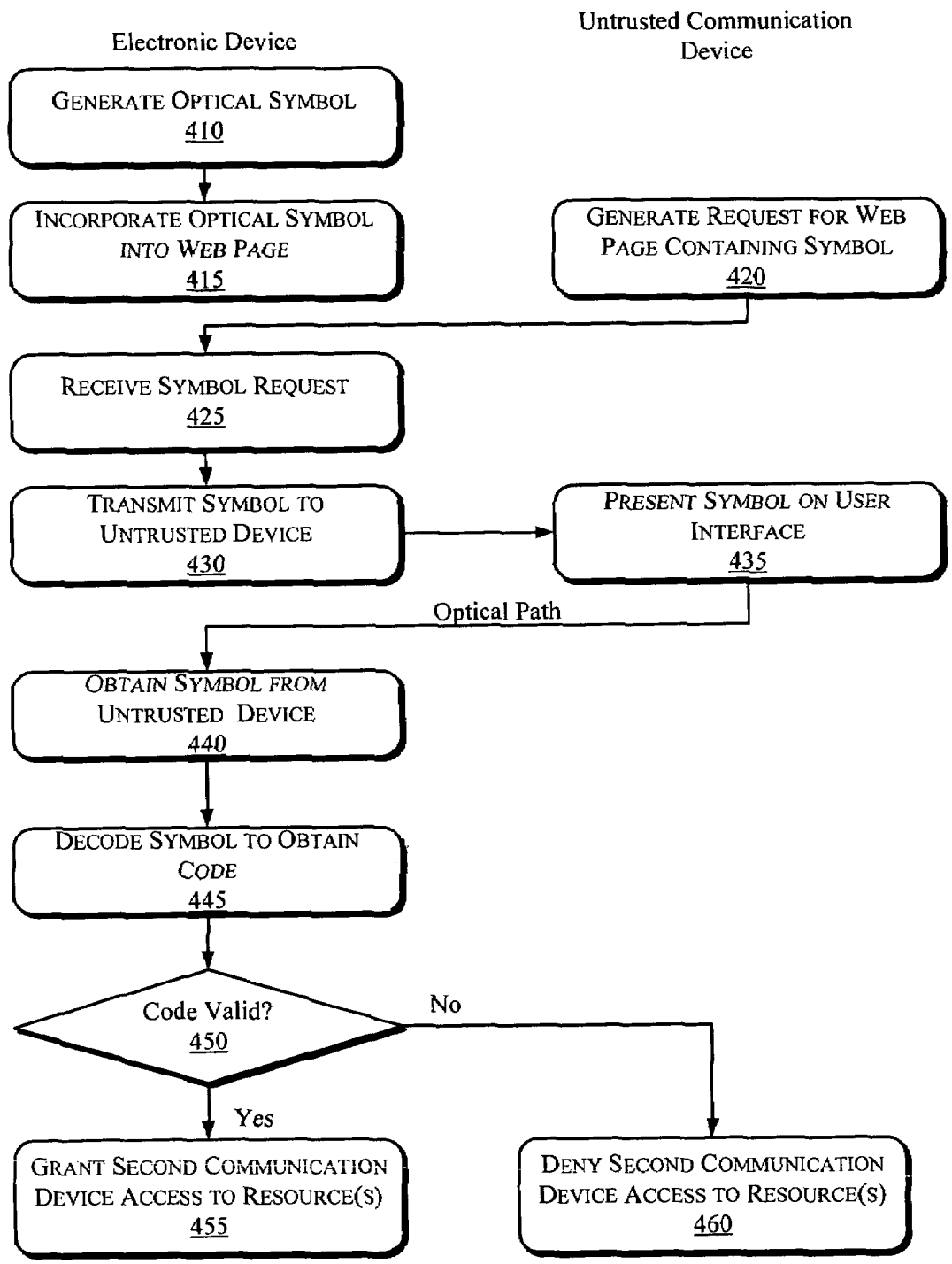
FIG. 4 is a flowchart illustrating code-based communication connection management operations performed according to some embodiments.

FIG. 4 is a flowchart illustrating code-based communication connection management operations performed according to some embodiments. In some embodiments, the operations of FIG. 4 may be used to facilitate establishing a relationship of trust between electronic device 310 and untrusted computing device 320.

Referring to FIG. 4, at operation 410 the electronic device 310 generates an optical symbol. The symbol may be embodied as an optical tag, a key sequence or the like. In some embodiments, electronic device 310 may include a symbol generator to generate the symbol. As described above, the symbol may be generated from a random number, such that there is no discernable relationship between successive symbols generated by electronic device, in order to avoid a replay attack using a symbol captured from an earlier time. As described in connection with FIG. 1A, the symbol may be displayed as an optical tag. At operation 415 electronic device 310 generates a web page that incorporates the symbol. For example, the web page may be stored in a file system maintained by the electronic device 310. Alternatively, the web page may be stored in a memory location in the electronic device.

At operation 420 the untrusted communication device 320 generates a request for the web page containing the symbol. For example, the user of electronic device 310 may use a web browser on untrusted communication device 320 to request the web page generated in operation 415 from electronic device 310.

At operation 425 the electronic device 310 receives the symbol request and, at operation 430 the electronic device 310 transmits the web page that includes the symbol to the untrusted communication device 420, e.g., via a wireless communication link.

At operation 435 the untrusted communication device 320 presents the symbol on a user interface and at operation 440 the electronic device obtains the symbol from the untrusted communication device 320. In some embodiments, untrusted communication device 320 may present a graphic symbol on an input/output interface such as, e.g., a monitor and a camera 312 on the electronic device 310 may be used to take, a, photograph of the symbol. In alternate embodiments untrusted communication device 320 may present a character sequence symbol on an input/output interface and a user of electronic device 310 may enter the character sequence on the keypad of electronic device 310.

At operation 445 the electronic device 310 decodes the symbol received from the untrusted computing device 320. If, at operation 450, the code is valid (i.e., if the decoded symbol received from the untrusted device matches the code used to by electronic device 310 to generate the symbol), then control passes to operation 455 and the untrusted communication device is granted access to the private resources on electronic device 310. By contrast, if at operation 450 the code is invalid (i.e., if the symbol received from the untrusted device does not match the symbol generated by electronic device 310), then control passes to operation 460 and the untrusted communication device is denied access to the private resources on electronic device 310. Thus, the operations of FIG. 4 enable an electronic device 310 to facilitate a communication connection between an untrusted communication device 320 and a one or more devices such as servers 330, 332 managing private resources for electronic device 310.

Figure 5:
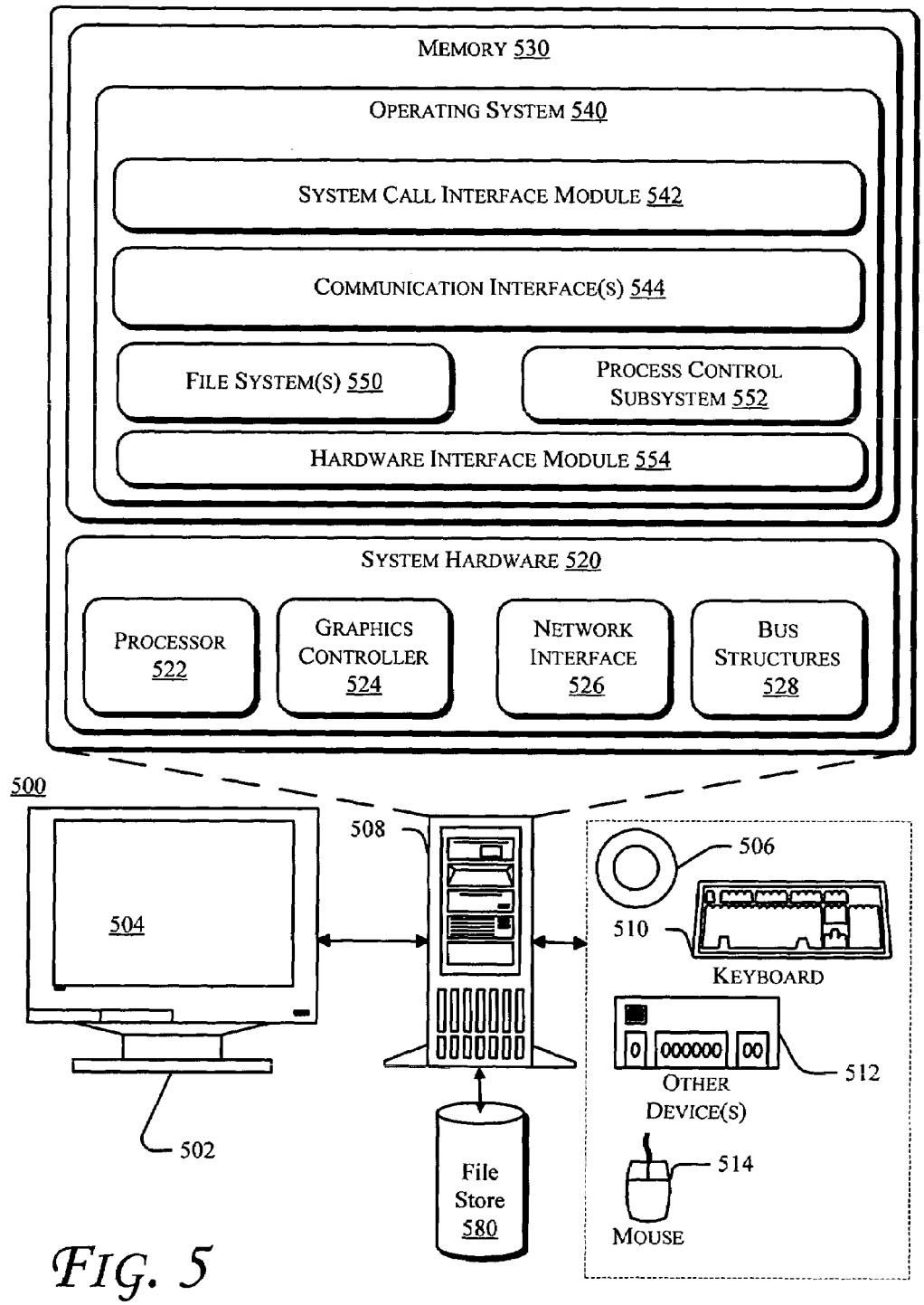
FIG. 5 is a schematic illustration a computing device in accordance with some embodiments.

FIG. 5 is a schematic illustration of a computing system 500 that may be used to implement untrusted computing device 320, servers 330, 332, or electronic device 310. In some embodiments, system 500 includes a computing device 508 and one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing device 508 includes system hardware 520 and memory 530, which may be implemented as random access memory and/or read-only memory. A file store 580 may be communicatively coupled to computing device 508. File store 580 may be internal to: computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, video controllers 524, network interfaces 526, and bus structures 528. In one embodiment, processor 522 may be embodied as an Intel® Pentium IV® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics controller 524 may function as an adjunction processor that manages graphics and/or video operations. Graphics controller 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 528. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one, embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508.

Operating system 540 may include (or manage) one or more communication interfaces that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

In various embodiments, the computing device 508 may be embodied as a personal computer, a laptop computer, a personal digital assistant, a mobile telephone, an entertainment device, or another computing device.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described, herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to facilitate a communication connection between a first communication device and a second communication device, comprising:

collecting, in an electronic device separate from the first communication device and the second communication device, a first identifier associated with a first communication device and second identifier associated with a second communication device, wherein at least one of the first communication device or the second communication device is a thin device which lacks a display or an input/output mechanism;

establishing a communication connection between the electronic device and the first communication device; and initiating, in the electronic device, a connection request for a communication connection between the first communication device and the second communication device, wherein collecting, in an electronic device, a first identifier associated with a first communication device and second identifier associated with a second communication device comprises:

obtaining a first symbol from the first communication device and a second symbol from the second communication device;

decoding the first symbol to obtain the first identifier; and decoding the second symbol to obtain the second identifier; and wherein obtaining a first symbol from the first communication device and a second symbol from the second communication device comprises:

collecting, with the electronic device, an image of a first optical tag associated with the first communication device;

collecting, with the electronic device, an image of a second optical tag associated with the second communication device;

decoding the first optical tag to obtain the first identifier; and decoding the second optical tag to obtain the second identifier.

2. The method of claim 1, wherein obtaining a first symbol from the first communication device and a second symbol from the second communication device comprises:

entering into an input/output mechanism on the electronic device a first character sequence associated with the first communication device;

entering into an input/output mechanism on the electronic device a second character sequence associated with the second communication device;

decoding the first character sequence to obtain the first identifier; and decoding the second character sequence to obtain the second identifier.

3. The method of claim 1, wherein the first identifier comprises a media access control (MAC) address for the first device and the second identifier comprises a MAC address for the second device, and further comprising establishing a communication connection between the first communication device and the second communication device.

4. The method of claim 3, further comprising terminating the communication connection between the electronic device and the first communication device.

5. An electronic apparatus, comprising:
a communication interface;
an input/output interface;
a processor;
means for collecting, in the electronic apparatus, a first identifier associated with a first communication device and second identifier associated with a second communication device, wherein the electronic apparatus is separate from the first electronic device and the second electronic device, wherein at least one of the first communication device or the second communication device is a thin device which lacks a display or an input/output mechanism;
means for establishing a communication connection between the electronic apparatus and the first communication device; and
means for initiating, in the electronic apparatus, a connection request for a communication connection between the first communication device and the second communication device;
means for obtaining a first symbol from the first communication device and a second symbol from the second communication device;
means for decoding the first symbol to obtain the first identifier;
means for decoding the second symbol to obtain the second identifier;
a camera to obtain an image of a first optical tag associated with the first communication device and a second optical tag associated with the second communication device;
means for decoding the first optical tag to obtain the first identifier; and
means for decoding the second optical tag to obtain the second identifier.

6. The electronic apparatus of claim 5, further comprising:
a keypad for entering into the electronic device a first character sequence associated with the first communication device and a second character sequence associated with the second communication device;
means for decoding the first character sequence to obtain the first identifier; and
means for decoding the second character sequence to obtain the second identifier.

7. The electronic apparatus of claim 5, wherein the first identifier comprises a media access control (MAC) address for the first device and the second identifier comprises a MAC address for the second device, and further comprising:
means for establishing a communication connection between the first communication device and the second communication device; and
means for terminating the communication connection between the electronic device and the first communication device.

8. A method to facilitate a communication connection between a first communication device and a second communication device, comprising:
receiving, in an electronic device separate from the first communication device and the second communication device, a symbol from a first communication device, wherein the first communication device or the second communication device is a thin device which lacks a display or an input/output mechanism; and
using the symbol to establish a communication connection between the first communication device and the second communication device;
receiving, in the electronic device, a symbol from the second communication device wherein:
the symbol from the first communication device comprises a code that identifies a network address of the second communication device;
the symbol from the second communication device comprises a code that identifies a network address of the third communication device; and
wherein using the symbol to establish a communication connection between the first communication device and a second communication device comprises:
establishing a communication connection between the electronic device and the first communication device; and
initiating, from the electronic device, a request for the first communication device to establish a communication connection with the second communication device.

9. The method of claim 8, wherein the first code comprises a media access control (MAC) address for the first device and the second identifier comprises a MAC address for the second device, and further comprising severing the communication connection between the electronic device and the first communication device.

10. The method of claim 8, wherein the symbol from the first communication device comprises an authentication code transmitted from the second communication device to the first communication device.

11. The method of claim 10, wherein using the symbol to establish a communication connection between the first communication device and a second communication device comprises:
decoding the symbol to obtain the authentication code; and
comparing the authentication code to an authentication code associated with the third communication device.

12. The method of claim 11, further comprising assigning a trusted status to the second communication device when the authentication code from the second communication device matches the authentication code associated with the first communication device.

13. A method to facilitate authentication of an untrusted communication device comprising:
receiving, in the untrusted communication device, a symbol associated with a trusted communication device;
presenting the symbol via an input/output interface coupled to the untrusted communication device;
capturing, in the trusted communication device, an image of the symbol presented on the input/output interface coupled to the untrused communication device; and
using the symbol to authenticate the untrusted communication device;
wherein using the symbol to authenticate the untrusted communication device comprises:
decoding the symbol to obtain a code; and
comparing the code to a code used by the trusted communication device to generate the symbol.

14. The method of claim 13, wherein receiving, in the untrusted communication device, a symbol from a trusted communication device comprises:

establishing a communication link between the trusted communication device and the untrusted communication device;

receiving, in the untrusted communication device, a link to a publicly available resource comprising the symbol; and accessing the publicly available resource on the trusted communication device to obtain the symbol.

15. The method of claim 14, wherein the publicly available resource is a publicly available web page which comprises the symbol; and accessing the publicly available resource comprises navigating to the publicly available web.

16. The method of claim 13, wherein:

presenting the symbol via an input/output interface comprises displaying the symbol on a monitor; and obtaining the symbol at the trusted communication device comprises obtaining an image of the symbol on the monitor using in image capture apparatus on the trusted communication device.

* * * * *